United States Patent
Nakajima et al.

(10) Patent No.: US 11,536,264 B2
(45) Date of Patent: Dec. 27, 2022

(54) GAS COMPRESSOR

(71) Applicant: Hitachi Industrial Equipment Systems Co., Ltd., Tokyo (JP)

(72) Inventors: Takashi Nakajima, Tokyo (JP); Akira Iyozumi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 17/286,233

(22) PCT Filed: Sep. 10, 2019

(86) PCT No.: PCT/JP2019/035463
§ 371 (c)(1),
(2) Date: Apr. 16, 2021

(87) PCT Pub. No.: WO2020/084939
PCT Pub. Date: Apr. 30, 2020

(65) Prior Publication Data
US 2021/0348603 A1 Nov. 11, 2021

(30) Foreign Application Priority Data
Oct. 26, 2018 (JP) .............................. JP2018-201687

(51) Int. Cl.
*F04B 49/06* (2006.01)
*F04B 41/06* (2006.01)
(Continued)

(52) U.S. Cl.
CPC ............ *F04B 49/065* (2013.01); *F04B 41/06* (2013.01); *G06F 11/0757* (2013.01); *G06F 11/327* (2013.01)

(58) Field of Classification Search
CPC .... F04B 49/065; F04B 41/06; G06F 11/0757; G06F 11/327
See application file for complete search history.

(56) References Cited

U.S. PATENT DOCUMENTS 6,973,794 B2 * 12/2005 Street ................. G05D 23/1917
62/181
7,228,691 B2 * 6/2007 Street .................... G05D 23/24
62/298
(Continued)

FOREIGN PATENT DOCUMENTS

| JP | 2003-21072 A | 1/2003 |
| JP | 2005-48755 A | 2/2005 |
| JP | 2010-59908 A | 3/2010 |

OTHER PUBLICATIONS

International Search Report (PCT/ISA/210) issued in PCT Application No. PCT/JP2019/035463 dated Nov. 12, 2019 with English translation (three (3) pages).
(Continued)

*Primary Examiner* — Kenneth J Hansen
(74) *Attorney, Agent, or Firm* — Crowell & Moring LLP

(57) ABSTRACT

A communication control system for a number of gas compressors where one gas compressor is set as a master gas compressor that controls communication with N slave gas compressors. A cycle of communication with the N slave compressors in N communication sets is defined as a total compressor number communication cycle. In first to Nth communication sets, a first response request is transmitted to each of the first to Nth gas compressors. When a response is received from one of the gas compressors, the system determines that connection with the one gas compressor has succeeded. When no response is received, the system determines that connection has failed. In following communication cycles, a second response request is transmitted to the slave compressors with which communication has succeeded. The first response request is then transmitted to the slave compressors with which the communication connection has failed using a different timing sequence.

7 Claims, 10 Drawing Sheets

(51) Int. Cl.
*G06F 11/07* (2006.01)
*G06F 11/32* (2006.01)

(56) References Cited

U.S. PATENT DOCUMENTS

| | | | | |
|---|---|---|---|---|
| 7,320,225 | B2* | 1/2008 | Street | G05D 23/24 |
| | | | | 417/18 |
| 8,850,838 | B2* | 10/2014 | Street | F25B 49/022 |
| | | | | 62/127 |
| 2004/0016244 | A1* | 1/2004 | Street | F25B 49/02 |
| | | | | 62/190 |
| 2004/0024495 | A1* | 2/2004 | Sunderland | F25B 49/02 |
| | | | | 62/132 |
| 2019/0101304 | A1* | 4/2019 | Yoon | H04W 52/245 |

OTHER PUBLICATIONS

Japanese-language Written Opinion (PCT/ISA/237) issued in PCT Application No. PCT/JP2019/035463 dated Nov. 12, 2019 with partial English translation (six (6) pages).

* cited by examiner

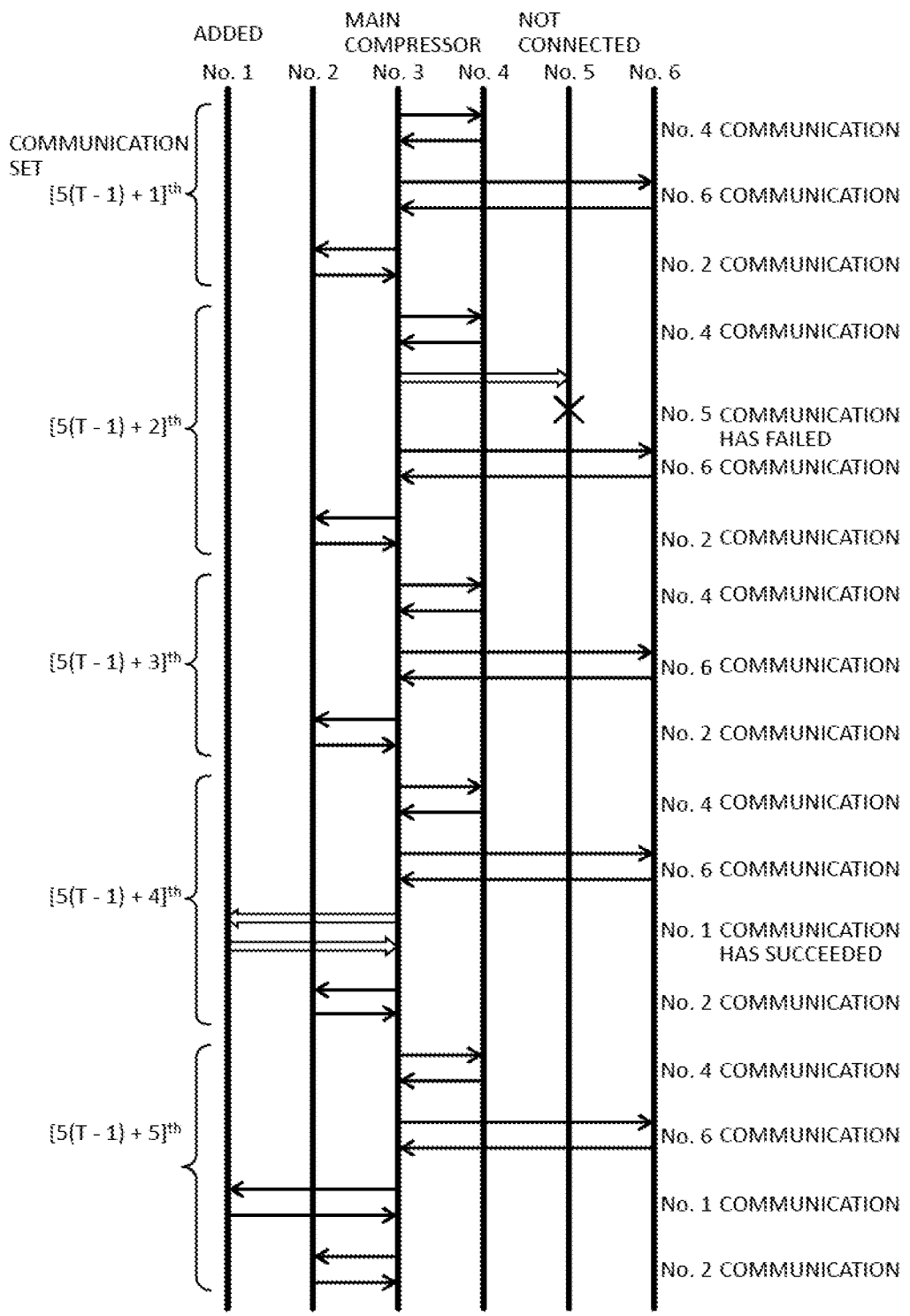

FIG. 12
FIG. 12A
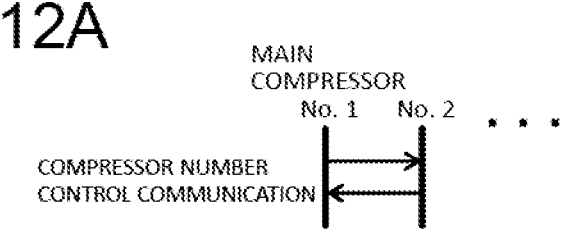
FIG. 12B
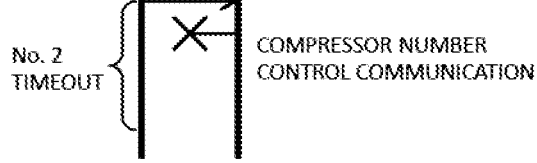
FIG. 12C
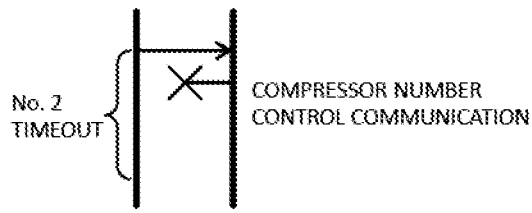
FIG. 12D
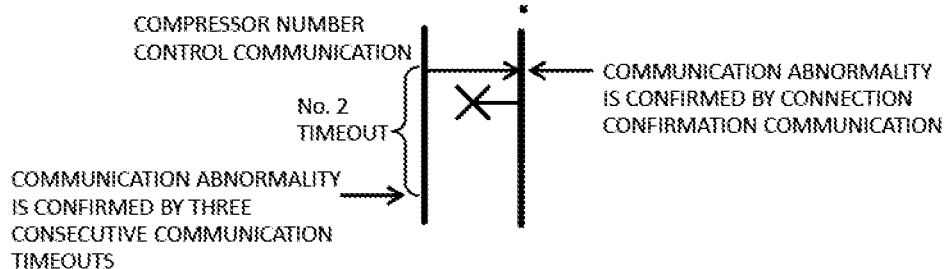

GAS COMPRESSOR

TECHNICAL FIELD

The present invention relates to a gas compressor, particularly to compressor number control of a plurality of gas compressors.

BACKGROUND ART

Patent Document 1 discloses the background art of a gas compressor number control system that efficiently operates a plurality of gas compressors in response to various changes in load. Patent Document 1 describes a compressor number control system including a plurality of constant speed compressors of which the drive frequency is constant; a predetermined number of inverter compressors of which the drive frequency is variable; an air pipe that connects compressed gas discharge sides of the constant speed compressors and the inverter compressors in common to send compressed gas to a compressed gas demand machine side; a pressure sensor that measures the pressure of the air pipe; and compressor number control means that controls the drive frequency of the inverter compressors according to the pressure value measured by the pressure sensor to adjust the capacities all the time, and controls the operating compressor number of the constant speed compressors based on a drive frequency signal from the inverter compressors and the detection value of the pressure sensor, and the compressor number control system is switched to an optimal operation pattern to correspond to a compressed gas demand machine.

CITATION LIST

Patent Document
  Patent Document 1: JP 2005-48755 A

SUMMARY OF THE INVENTION

Problems to be Solved by the Invention

In Patent Document 1, when plural compressor operation control is performed on the compressors, the compressors are controlled by using the compressor number control means that controls the compressors from outside. However, a device which controls the compressors is required to be separately provided, so that the system becomes expensive, which is a problem.

An object of the present invention is to realize inexpensive and simple compressor number control of gas compressors in view of the problem.

Solutions to Problems

In one example of the present invention, there is provided a gas compressor set as a master gas compressor that performs compressor number control on N slave gas compressors, the compressor including: a communication I/F that is communicable with the slave gas compressors; and a control unit. When one cycle of communication with the N slave gas compressors in N communication sets is defined as a total compressor number communication cycle, in an initial total compressor number communication cycle, in first to $N^{th}$ communication sets, the control unit transmits a first response request to each of first to $N^{th}$ slave gas compressors, and when the control unit receives a response from the slave gas compressors, the control unit determines that communication connection with the slave gas compressors has succeeded, and when the control unit receives no response from the slave gas compressors, the control unit determines that communication connection with the slave gas compressors has failed. In second and following total compressor number communication cycles, the control unit transmits a second response request to the slave gas compressors, with which the communication connection has succeeded, in each of the communication sets, and transmits the first response request to the slave gas compressors, with which the communication connection has failed, at different timings again.

Effects of the Invention

According to the present invention, it is possible to realize inexpensive and simple compressor number control of the gas compressors.

BRIEF DESCRIPTION OF THE DRAWINGS

FIG. 10 is a diagram illustrating a communication sequence in the case of success of communication with slave compressors in a $T^{th}$ total compressor number communication cycle in the embodiment.

FIGS. 12A to 12D illustrates description diagrams of a communication abnormality when communication from a slave compressor is not sent to a master compressor in the embodiment.

MODE FOR CARRYING OUT THE INVENTION

Hereinafter, an embodiment of the present invention will be described with reference to the drawings.

First Embodiment

In the present embodiment, an external control panel which controls gas compressors from outside is not used, a plurality of the gas compressors are connected to each other, and a gas compressor to be newly added can be incorporated into plural compressor operation control only by communication connection or setting for the gas compressor, so that inexpensive and simple compressor number control of the gas compressors is realized.

Figure 1:
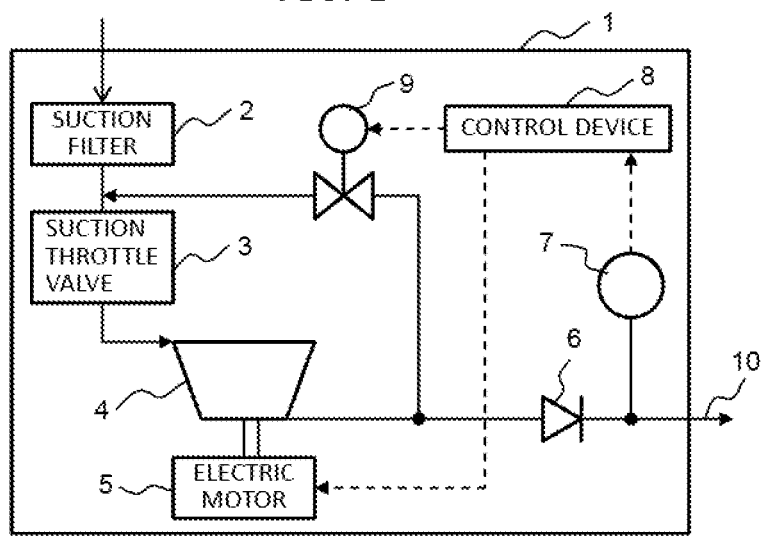
FIG. 1 is a schematic block diagram of a gas compressor in an embodiment.

In the present embodiment, a gas compressor which compresses air will be described as an example. FIG. 1 is a schematic block diagram of the gas compressor in the present embodiment. In FIG. 1, a gas compressor 1 is configured such that air is suctioned through a suction filter 2 and a suction throttle valve 3 and the suctioned air is compressed to a predetermined pressure by a compressor main body 4 driven by an electric motor 5. The compressed air passes through a pressure regulating check valve 6, an aftercooler, and a dryer (not illustrated), and then is output from a discharge port 10 to the outside. A pressure sensor 7 measures the discharge pressure of the compressed air, and a control device 8 compares the discharge pressure measured by the pressure sensor 7 with a set pressure to control the electric motor 5 such that the measured discharge pressure is a target pressure. In addition, the control device 8 controls opening and closing of an opening and closing device 9 to change the amount of air inflow from the suction throttle valve 3, thus to perform operation control of the gas compressor 1.

Figure 2:
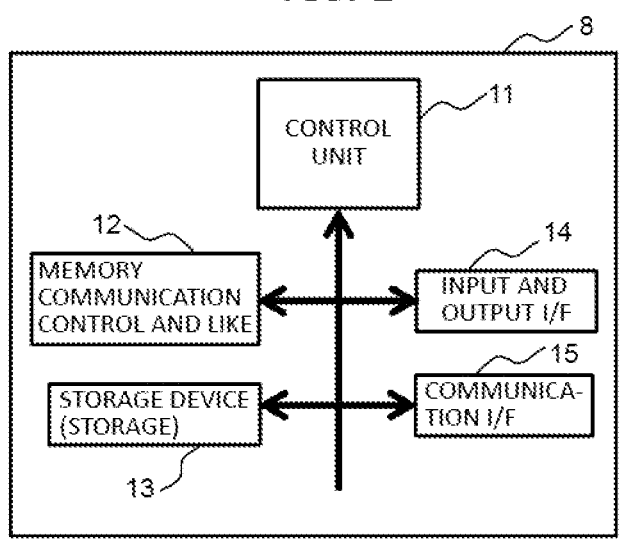
FIG. 2 is a schematic block diagram of a control device in the embodiment.

FIG. 2 is a schematic block diagram of the control device 8 in the present embodiment. In FIG. 2, the control device 8 includes a control unit 11 that performs a process such as the above-described operation control of the gas compressor 1 or communication control to be described later, a memory 12 that primarily stores a processing program to be executed by the control unit 11 or data to be executed, a storage device 13 that stores a processing program or various parameters for executing the processing of the control unit 11, an input and output interface (I/F) 14 that is used to operate the control unit 11 or outputs a processing result of the control unit 11, and a communication interface (I/F) 15 through which communication connection with other gas compressors is made. Namely, when the host compressor is a master compressor, the control unit 11 controls the host gas compressor, and controls each of slave compressors which are other gas compressors connected to the communication I/F 15. When the host compressor is a slave compressor, the host gas compressor is controlled according to an instruction of a master compressor which is another gas compressor connected to the communication I/F 15.

Figure 3:
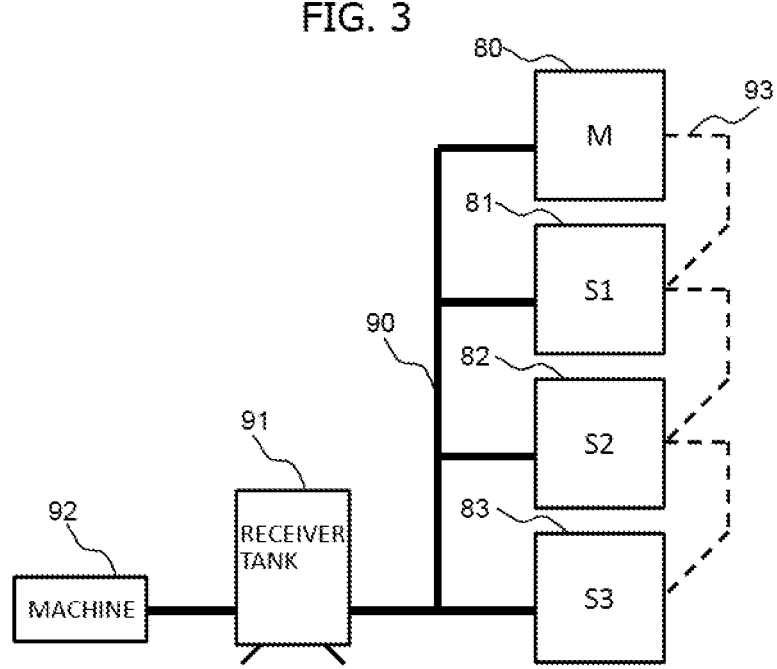
FIG. 3 is a block diagram of pipe connection and communication connection of a plurality of gas compressors in the embodiment.

FIG. 3 is a block diagram of pipe connection and communication connection of a plurality of gas compressors in the present embodiment. FIG. 3 illustrates an example in which four gas compressors are connected to each other, one of which is a master compressor M80 and the other three are No. 1 to No. 3 slave compressors S1 to S3 (81 to 83). The system illustrated in FIG. 3 includes the master compressor M80, the No. 1 to No. 3 slave compressors S1 to S3 (81 to 83) that are connected to the master compressor M80 by a collection pipe 90, a receiver tank 91 that is connected by the collection pipe 90 to store compressed gas, a machine 92 that is located ahead of the receiver tank 91 to use the compressed gas. In addition, the master compressor M80 and the No. 1 to No. 3 slave compressors S1 to S3 (81 to 83) are configured such that communication connection 93 is established therebetween by wire or wirelessly. Incidentally, when a new slave compressor is added, the new slave compressor can be connected to the collection pipe 90 and the communication connection 93 to be incorporated into plural compressor number control.

In the present embodiment, during installation, compressor numbers and a master compressor number are randomly set for a plurality of gas compressors to be connected to each other. The reason is that when compressor number control is performed only by the compressors, in consideration of maintenance or the like of a gas compressor which is a master of communication, the master is required to be changeable. For example, when four gas compressors are connected to each other, compressor numbers from No. 1 to No. 4 are set for the gas compressors, and when the master compressor is a No. 3 compressor, the fact that the master compressor is the No. 3 compressor is set for each of the compressors. Specifically, the control unit 11 sets a compressor number for the host gas compressor and a master compressor number based on information input via the input and output I/F 14 of FIG. 2.

As a communication sequence, communication for compressor number control with compressors having larger numbers than that of the master compressor is performed in ascending order of the numbers. After all the communication with the compressors having larger numbers than that of the master is completed, communication with compressors having smaller numbers than that of the master compressor is performed in ascending order of the compressor numbers. For example, when the master compressor is the No. 3 compressor, communication is performed in order of the No. 4, No. 1, and No. 2 compressors.

In the present embodiment, a slave compressor can be added to the compressor number control without stopping even during compressor number control operation. Namely, when a total number of slave compressors connectable are connected to the collection pipe 90 but a communication line is not connected or compressor number control setting is not set, the slave compressors can be added to the compressor number control. For this reason, when the communication line is not connected or the compressor number control setting is not set, the master compressor is required to continue to confirm whether or not to be communicable with the slave compressors that are not communicable. However, when communication with the compressors which are not communicable is performed, a timeout waiting time which is a communication waiting time for which it is determined that communication is not possible is required. For this reason, it takes extra time to communicate with the compressors that are normally communicable. Therefore, a connection confirmation cycle is provided separately from a normal communication cycle in which operation control or the like is performed without always performing connection confirmation as to whether or not communication is possible.

Namely, communication for connection confirmation is performed at a slower cycle than that of normal communication, so that the time required for communication is reduced. Details will be described later.

Figure 4:
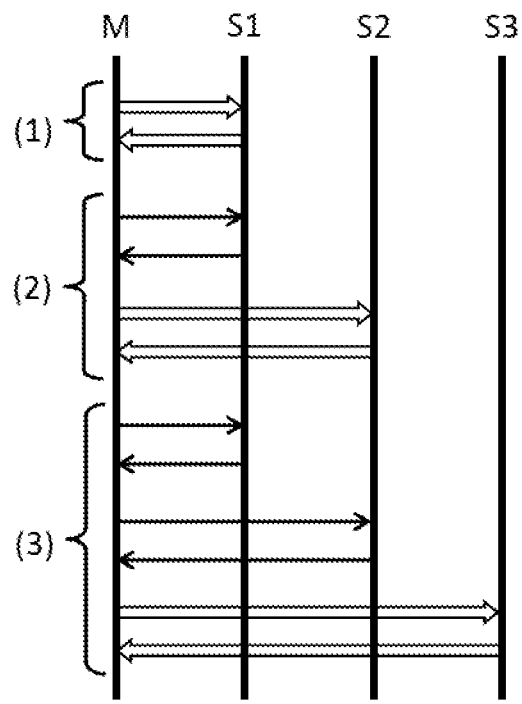
FIG. 4 is a diagram illustrating a communication sequence in the case of success of communication connection during an initial total compressor number communication cycle in the embodiment.

FIG. 4 is a diagram illustrating a communication sequence in the case of success of communication connection during an initial total compressor number communication cycle in the present embodiment, when one cycle of communication with a total number of compressors connectable is defined as a total compressor number communication cycle. FIG. 4 illustrates an example which is based on the configuration of FIG. 3 and in which four gas compressors are connected to each other, one of which is a master compressor M and the other three are No. 1 to No. 3 slave compressors S1 to S3.

In FIG. 4, since there are three slave compressors, a description will be given based on the assumption that three communication sets form one total compressor number communication cycle. First, in a first communication set (1), a first response request (white arrow) is transmitted from the master compressor M to the No. 1 slave compressor S1. Here, the first response request is a response request for performing connection confirmation, and can be dealt with, for example, by sending a stop command to a slave compressor which is a target, as a dummy command. Meanwhile, the No. 1 slave compressor S1 which has received the first response request from the master compressor M transmits a response to the master compressor M. The master compressor M which has received the response from the No. 1 slave compressor S1 determines that the No. 1 slave compressor S1 can be under plural compressor operation control.

Next, in a second communication set (2), a second response request is transmitted from the master compressor M to the No. 1 slave compressor S1 which has responded to the first response request and has been determined to be able to be under plural compressor operation control. Here, the second response request is a response request for a specific operation command. The No. 1 slave compressor S1 which has received the second response request from the master compressor M transmits a response to the master compressor M. In addition, a first response request (white arrow) is transmitted from the master compressor M to the No. 2 slave compressor S2. The No. 2 slave compressor S2 which has received the first response request from the master compressor M transmits a response to the master compressor M. The master compressor M which has received the response from the No. 2 slave compressor S2 determines that the No. 2 slave compressor S2 can be under plural compressor operation control.

Here, a data format of communication between a master compressor and each of slave compressors in the present embodiment will be described. FIG. 5 is the data format of communication between the master compressor and each of the slave compressors in the present embodiment. In FIG. 5, (a) is a communication data format that is transmitted from the master compressor to the slave compressor, and (b) is a communication data format that is reversely transmitted from the slave compressor to the master compressor.

Figure 5A:
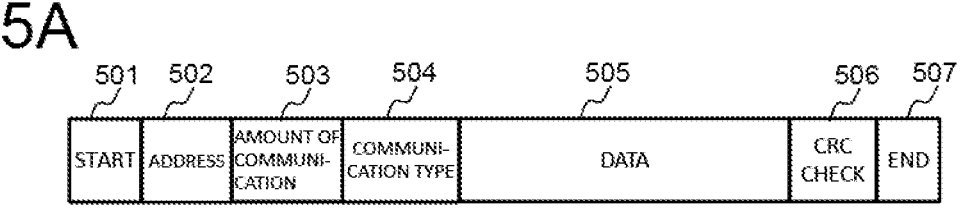
FIGS. 5A and 5B are data formats of communication between a master compressor and each of slave compressors in the embodiment.

In FIG. 5(a), 501 is a start code, 502 is the address of a slave compressor which is a target, 503 is the amount of communication, 504 is a communication type, 505 is data, 506 is a CRC check code, and 507 is an end code. Here, data 505 is data indicating a start and stop command, a load and unload command, or the like as an operation control command, and also contains data indicating the number of connected compressors as an operation state. Regarding the data indicating the number of connected compressors, in consideration of maintenance or the like, the master compressor is required to be changed. For this reason, information on how many compressors of all the compressors are currently connected is required, and it is troublesome to reset the number of connected compressors for all the compressors whenever maintenance is performed. Therefore, the purpose of the data is to periodically send communication for connection confirmation to be able to automatically figure out the current number of connected compressors.

Figure 5B:
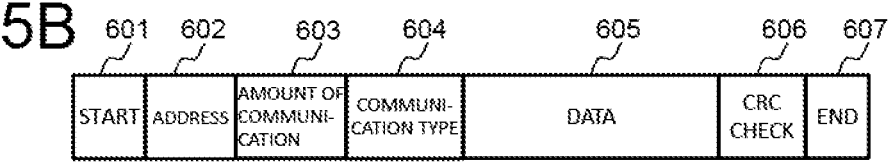

In addition, in FIG. 5(b), 601 is a start code, 602 is the address of a slave compressor which is a sender, 603 is the amount of communication, 604 is a communication type, 605 is data, 606 is a CRC check code, and 607 is an end code. Here, data 605 is data indicating a command response, and also contains normal and abnormal data which is state information.

Returning to FIG. 4, in the next third communication set (3), a second response request is transmitted from the master compressor M to the No. 1 slave compressor S1 which has responded to the first response request and has been determined to be able to be under plural compressor operation control. The command content here is different from the command content in the second communication set (2). The No. 1 slave compressor S1 which has received the second response request from the master compressor M transmits a response to the master compressor M. In addition, a second response request is transmitted from the master compressor M to the No. 2 slave compressor S2 which has responded to the first response request and has been determined to be able to be under plural compressor operation control. The No. 2 slave compressor S2 which has received the second response request from the master compressor M transmits a response to the master compressor M. In addition, a first response request (white arrow) is transmitted from the master compressor M to the No. 3 slave compressor S3. The No. 3 slave compressor S3 which has received the first response request from the master compressor M transmits a response to the master compressor M. The master compressor M which has received the response from the No. 3 slave compressor S3 determines that the No. 3 slave compressor S3 can be under plural compressor operation control. Thereafter, a second response request is transmitted from the master compressor to the slave compressors which have responded to the first response request in each communication set, and compressor number control is performed. The above is the communication sequence when communication connection between the master compressor and all the slave compressors has succeeded during the initial total compressor number communication cycle.

Figure 6:
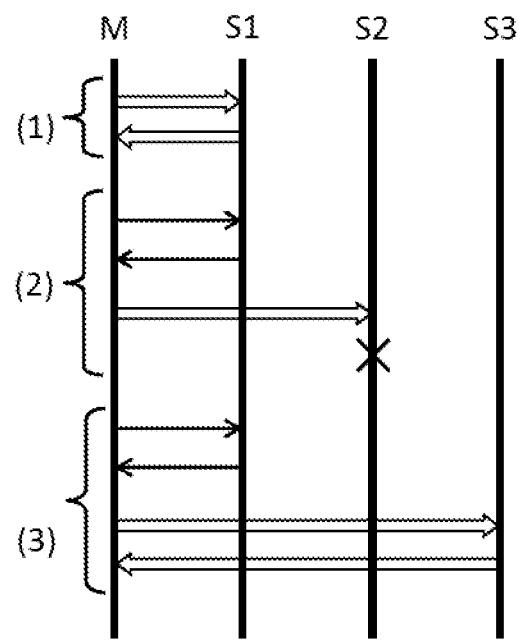
FIG. 6 is a diagram illustrating a communication sequence in the case of failure of communication connection during the initial total compressor number communication cycle in the embodiment.

Next, a communication sequence in the case of failure of communication connection during the initial total compressor number communication cycle will be described. FIG. 6 is a diagram illustrating a communication sequence in the case of failure of communication connection during the initial total compressor number communication cycle in the present embodiment.

In FIG. 6, the first communication set (1) is the same as that in FIG. 5; however, in the second communication set (2), after a first response request is transmitted from the master compressor M to the No. 2 slave compressor S2, when the master compressor M fails to receive a response for the first response request from the No. 2 slave compressor S2, or the No. 2 slave compressor S2 for which compressor number control is not set does not respond to the master compressor M, the master compressor M determines that communication connection has failed, and then determines that the No. 2 slave compressor S2 cannot be under plural compressor operation control.

Then, in the next third communication set (3), a second response request is transmitted from the master compressor M to the No. 1 slave compressor S1 which has responded to the first response request and has been determined to be able to be under plural compressor operation control. The No. 1 slave compressor S1 which has received the second response request from the master compressor M transmits a response to the master compressor M. In addition, a first response request (white arrow) is transmitted from the master compressor M to the No. 3 slave compressor S3. The No. 3 slave compressor S3 which has received the first response request from the master compressor M transmits a response to the master compressor M. The master compressor M which has received the response from the No. 3 slave compressor S3 determines that the No. 3 slave compressor S3 can be under plural compressor operation control. The above is the communication sequence when communication connection between the master compressor M and the No. 1 slave compressor S1 and the No. 3 slave compressor S3 has succeeded and communication connection between the master compressor M and the No. 2 slave compressor S2 has failed in the initial total compressor number communication cycle.

Incidentally, thereafter, the second response request is sent from the master compressor M to the No. 1 slave compressor S1 and the No. 3 slave compressor S3, which have responded to the first response request, in each communication set, and compressor number control is performed. The first response request is sent to the No. 2 slave compressor S2, from which a response for the first response request cannot be received, in each total compressor number communication cycle, and the No. 2 slave compressor S2 is added to the compressor number control whenever a response for the first response request is received. Details will be described later.

Figure 7:
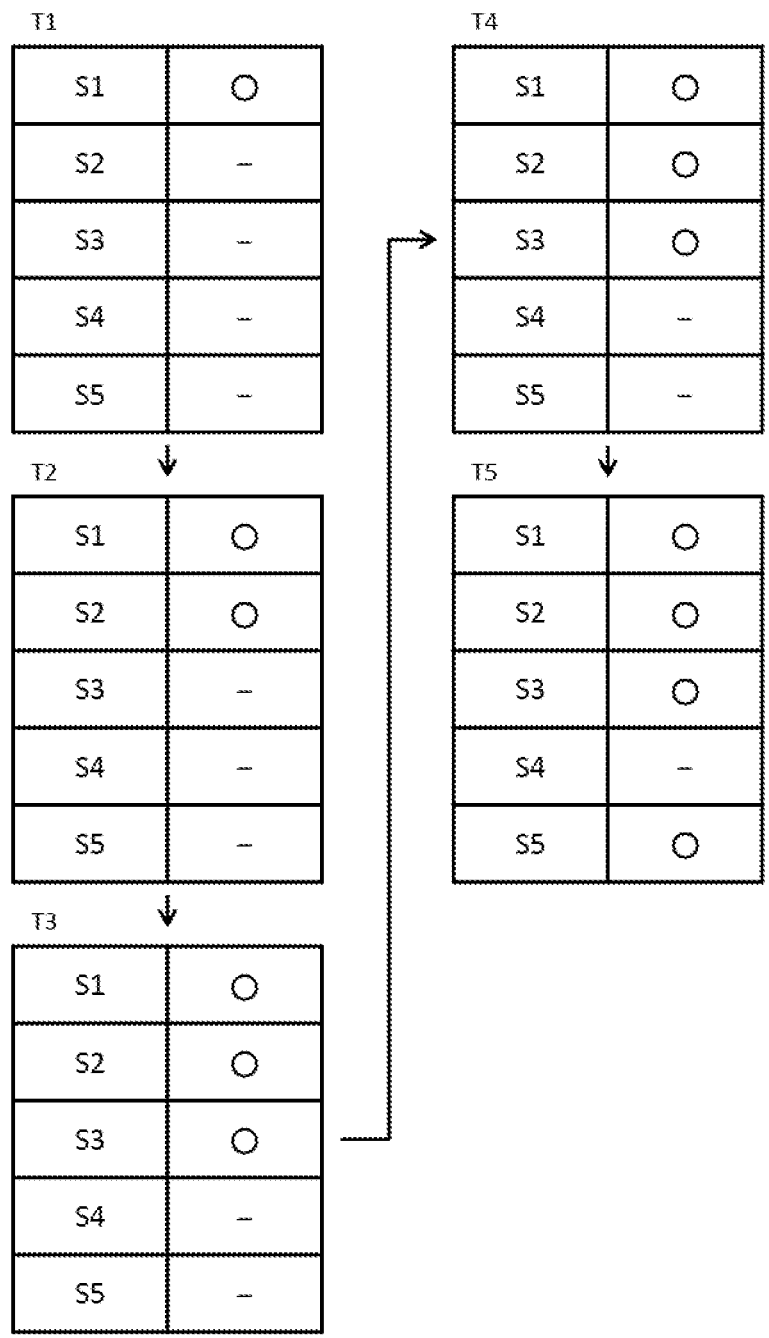
FIG. 7 is an update example of a slave compressor connection confirmation table in the embodiment.

FIG. 7 is an update example of a slave compressor connection confirmation table in the present embodiment. FIG. 7 illustrates an example in which six gas compressors are connected to each other, one of which is a master compressor and the other five are No. 1 to No. 5 slave compressors S1 to S5.

In FIG. 7, when a cycle of communication with a total number of compressors connectable is defined as T, in an initial total compressor number communication cycle T1, a first response request from the master compressor is transmitted to the No. 1 slave compressor S1. When there is a response from the No. 1 slave compressor S1, S1 in the table is updated from "-" to "O".

In a total compressor number communication cycle T2 subsequent to T1, since S1 is "O" in T1, a second response request from the master compressor is transmitted to the No. 1 slave compressor S1, and a first response request is transmitted to the No. 2 slave compressor S2. When there is a response from the No. 1 slave compressor S1, S1 in the table remains as "O", and when there is a response from the No. 2 slave compressor S2, S2 in the table is updated from "-" to "O".

In a total compressor number communication cycle T3 subsequent to T2, since S1 and S2 are "O" in T2, a second response request from the master compressor is transmitted to the No. 1 slave compressor S1 and the No. 2 slave compressor S2, and a first response request is transmitted to the No. 3 slave compressor S3. When there are responses from the No. 1 slave compressor S1 and the No. 2 slave compressor S2, S1 and S2 in the table remain as "O", and when there is a response from the No. 3 slave compressor S3, S3 in the table is updated from "-" to "O".

In a total compressor number communication cycle T4 subsequent to T3, since S1, S2, and S3 are "O" in T3, a second response request from the master compressor is transmitted to the No. 1 slave compressor S1, the No. 2 slave compressor S2, and the No. 3 slave compressor S3, and a first response request is transmitted to the No. 4 slave compressor S4. When there are responses from the No. 1 slave compressor S1, the No. 2 slave compressor S2, and the No. 3 slave compressor S3, S1, S2, and S3 in the table remain as "O", and when there is no response from the No. 4 slave compressor S4, S4 in the table remains as "-".

In a total compressor number communication cycle T5 subsequent to T4, since S1, S2, and S3 are "O" in T4, a second response request from the master compressor is transmitted to the No. 1 slave compressor S1, the No. 2 slave compressor S2, and the No. 3 slave compressor S3, and a first response request is transmitted to the No. 5 slave compressor S5. When there are responses from the No. 1 slave compressor S1, the No. 2 slave compressor S2, and the No. 3 slave compressor S3, S1, S2, and S3 in the table remain as "O", and when there is a response from the No. 5 slave compressor S5, S5 in the table is updated from "-" to "O".

In a total compressor number communication cycle T6 subsequent to T5 and the following cycles, a second response request is sent to the No. 1 slave compressor S1, the No. 2 slave compressor S2, the No. 3 slave compressor S3, and the No. 5 slave compressor S5. When the master compressor determines that the maximum number of connected compressors is 6, the timing a first response request is transmitted to the No. 4 slave compressor again is set to T9 after 4T from T5 in order to prevent unnecessary communication. Namely, when the maximum number of connected compressors is N, and the total compressor number communication cycle is a $T^{th}$ cycle, communication with an $n^{th}$ slave compressor is performed in a communication set determined by the following equation (1).

$$(N-1)(T-1)+n \quad (1)$$

In the above example, $(6-1)(2-1)+4=9$.

When a control signal for compressor number control is generated in each communication set, as illustrated in FIG. 5(a), the second response request includes an operation control command for each of the compressors. When the slave compressor which is updated to "O" in the table in the first response request does not respond to the second response request, the slave compressor is updated from "O" to "x" in the table, which indicates a communication abnormality. When the first response request is transmitted to the slave compressor which is updated to "x" due to having not responded to the second response request, and there is a response therefrom, the slave compressor is updated from "x" to "O".

Figure 8:
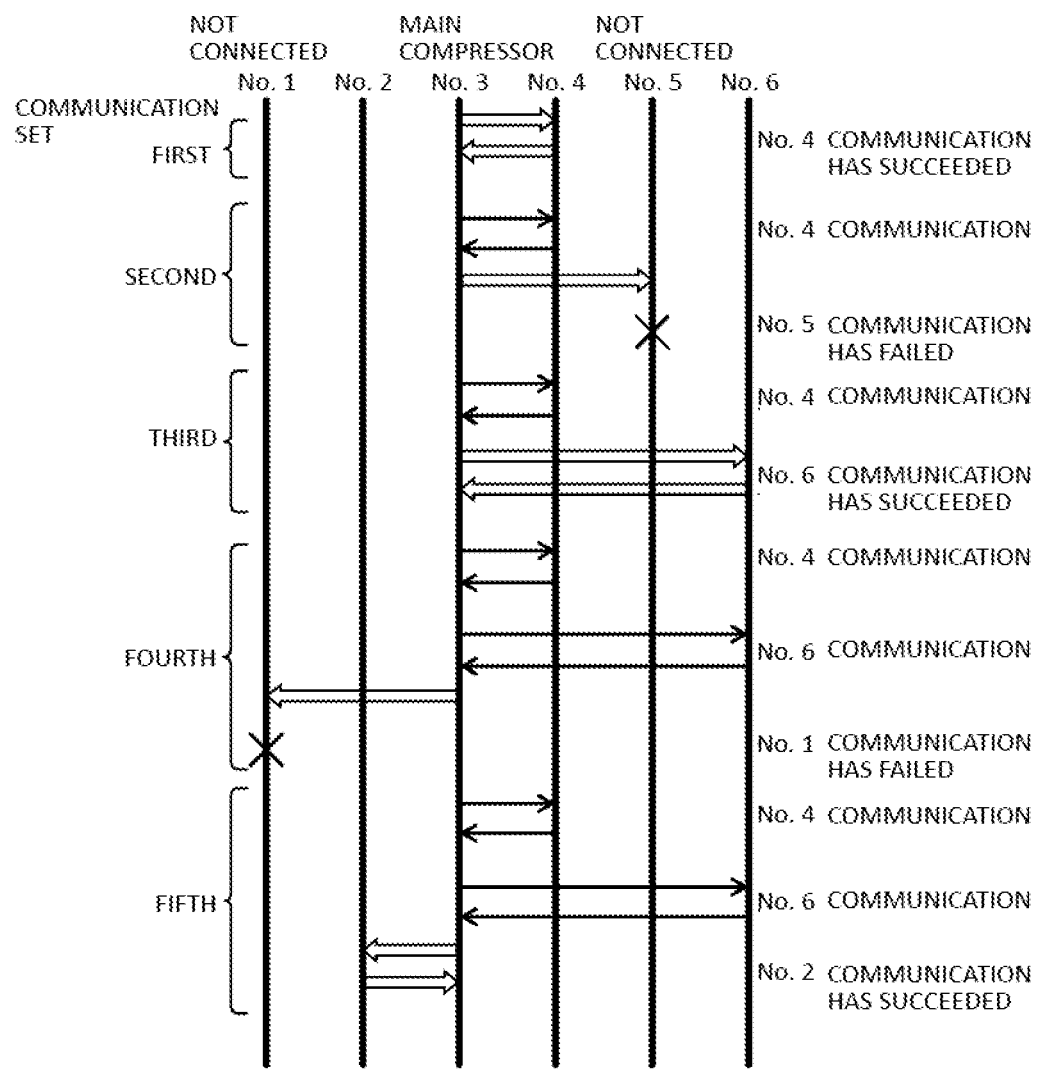
FIG. 8 is a diagram illustrating a communication sequence during the initial total compressor number communication cycle in the embodiment.
Figure 9:
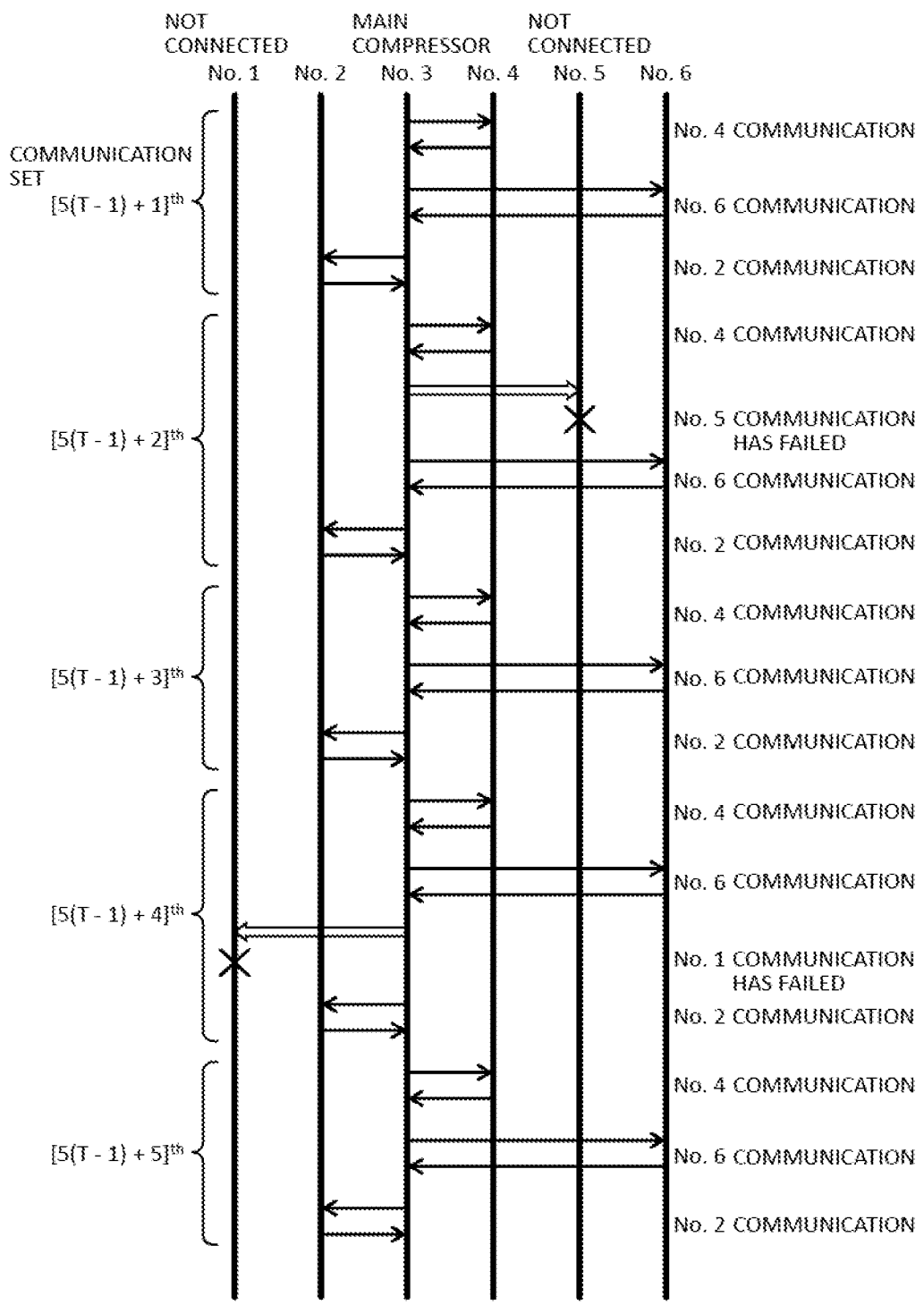
FIG. 9 is a diagram illustrating a communication sequence during a second total compressor number communication cycle in the embodiment.
Figure 11A:
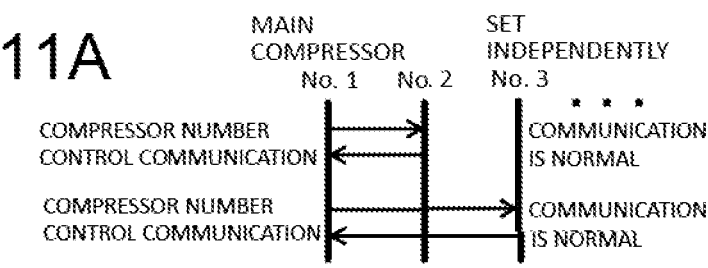
FIGS. 11A to 11D illustrates description diagrams of a communication abnormality when communication from a master compressor is not sent to slave compressors in the embodiment.
Figure 11B:
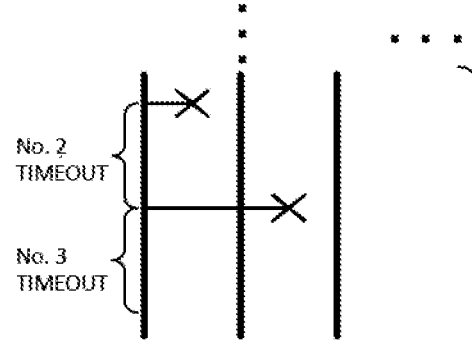
Figure 11C:
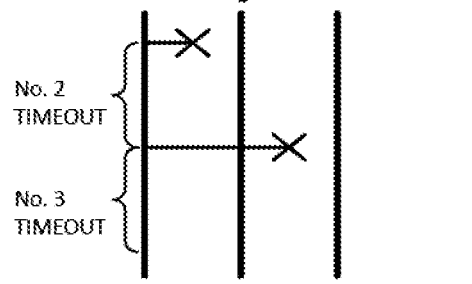
Figure 11D:
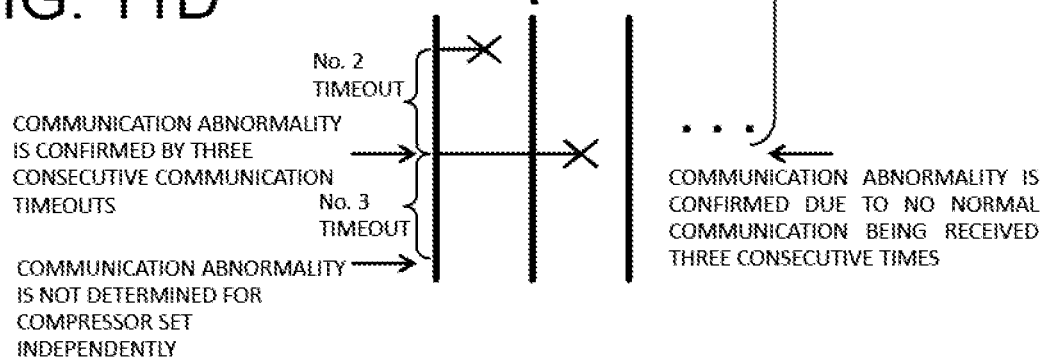
Figure 13A:
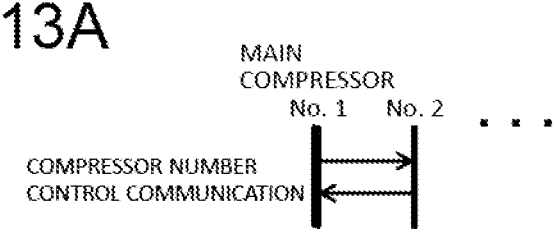
FIGS. 13A to 13D illustrates description diagrams of a communication abnormality when a communication message from a master compressor or a slave compressor has collapsed in the embodiment.
Figure 13B:
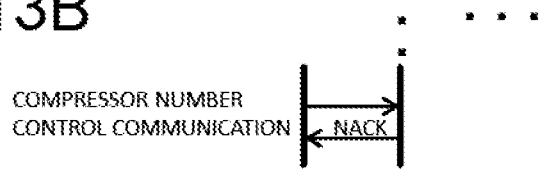
Figure 13C:
Figure 13D:
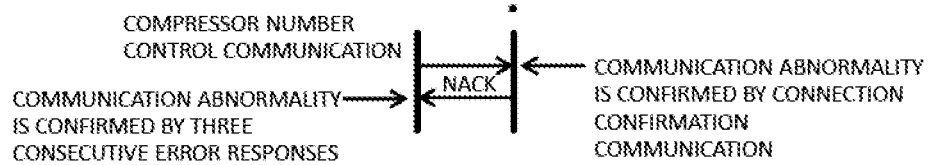

Next, a communication sequence when six gas compressors are connected to each other and a master compressor has completed compressor number control setting for No. 3, No. 2, No. 4, and No. 6 slave compressors and a communication line is not connected to and compressor number control setting is not set for No. 1 and No. 5 slave compressors will be described with reference to FIGS. 8 and 9. FIG. 8 is a diagram illustrating a communication sequence during an initial total compressor number communication cycle. FIG. 9 is a diagram illustrating a communication sequence during a second total compressor number communication cycle.

In FIGS. 8 and 9, according to the above-described communication sequence, communication for compressor number control with compressors having larger numbers than that of the master compressor is performed in ascending order of the numbers, and after all the communication with the compressors having larger numbers than that of the master is completed, communication with compressors having smaller numbers than that of the master compressor is performed in ascending order of the compressor numbers. Namely, since the master compressor (main compressor) is the No. 3 compressor, communication is performed in order of the No. 4, No. 5, No. 6, No. 1, and No. 2 compressors. Since the details are the same as those in FIGS. 4 and 5, a description thereof will be omitted; however, as illustrated in FIGS. 8 and 9, communication with the No. 2, No. 4, and No. 6 compressors with which communication has succeeded is performed each time in each communication set, and communication for connection confirmation as to whether or not the No. 1 and No. 5 compressors which are not connected are connected is performed periodically at different timings. Namely, since the No. 1 compressor is a fourth slave compressor in the case of the maximum number N of connected compressors=6 and the $T^{th}$ total compressor number communication cycle, according to the above equation (1), communication for connection confirmation is performed in a communication set determined by (6−1)(T−1)+4=5(T−1)+4. In addition, since the No. 5 compressor is a second slave compressor, communication for connection confirmation is performed in a communication set determined by 5(T−1)+2.

Incidentally, FIG. 10 illustrates a case where communication with the No. 1 compressor has succeeded in a communication set, which is determined by 5(T−1)+4, in the $T^{th}$ total compressor number communication cycle.

Next, details of a communication abnormality will be described. FIG. 11 illustrates description diagrams when communication from a master compressor is not sent to slave compressors. In FIG. 11, the master compressor (main compressor) is No. 1, No. 2 is a slave compressor, and No. 3 is a gas compressor set independently. In FIG. 11, in (a), communication between the master compressor which is No. 1 and the slave compressor which is No. 2 is normally performed by compressor number control communication, and in subsequent communication (b), when communication is not sent from the master compressor to the slave compressor, the master compressor waits for a timeout waiting time for when a response cannot be received, and determines that a first communication abnormality has occurred. In addition, in subsequent communication (c) and (d), similarly, when communication is not sent from the master compressor to the slave compressor, a timeout waiting time is waited, and it is determined that communication abnormalities have occurred three consecutive times, the master compressor determines that the communication abnormality is confirmed. Incidentally, also the slave compressor which is No. 2 does not receive communication three consecutive times, and it is determined that the communication abnormality is confirmed. Incidentally, a communication abnormality is not determined for the gas compressor which is No. 3 and is set independently instead of being under plural compressor number control.

FIG. 12 illustrates description diagrams when communication from a slave compressor is not sent to a master compressor. In FIG. 12, the master compressor (main compressor) is No. 1 and No. 2 is a slave compressor. In (a), communication between the master compressor which is No. 1 and the slave compressor which is No. 2 is normally performed by compressor number control communication, and in subsequent communication (b), when communication is not sent from the slave compressor to the master compressor, the master compressor waits for a timeout waiting time for when a response cannot be received, and determines that a first communication abnormality has occurred. In addition, in subsequent communication (c) and (d), similarly, when communication is not sent from the slave compressor to the master compressor, a timeout waiting time is waited, and it is determined that communication abnormalities have occurred three consecutive times, the master compressor determines that the communication abnormality is confirmed. Incidentally, the communication abnormality is confirmed for the slave compressor, which is No. 2, by connection confirmation communication.

FIG. 13 illustrates description diagrams when a communication message from a master compressor or a slave compressor has collapsed. In FIG. 13, the master compressor (main compressor) is No. 1 and No. 2 is a slave compressor. In (a), communication between the master compressor which is No. 1 and the slave compressor which is No. 2 is normally performed by compressor number control communication, and in subsequent communication (b), when a communication message has collapsed, the master compressor determines that there is an error, namely, a first communication abnormality has occurred. In addition, in subsequent communication (c) and (d), similarly, when a communication message has collapsed, the master compressor determines that communication abnormalities have occurred three consecutive times, and determines that the communication abnormality is confirmed. Incidentally, the communication abnormality is confirmed for the slave compressor, which is No. 2, by connection confirmation communication.

Incidentally, even in the cases of FIGS. 11 to 13 described above, the compressor in which a communication abnormality has occurred is treated as an unconnected device thereafter, a connection confirmation is performed in a communication cycle for connection confirmation, and when the communication abnormality is removed, the compressor is automatically restored. In addition, the number of the slave compressor in which a communication abnormality has occurred, or a number which specifies the slave compressor may be displayed on a display unit.

As described above, according to the present embodiment, an external control panel which controls gas compressors from outside is not used, a plurality of the gas compressors are connected to each other, and a gas compressor to be newly added can be incorporated into plural compressor operation control only by communication connection or setting for the gas compressor, so that inexpensive and simple compressor number control of the gas compressors is realized.

The embodiment has been described above; however, the present invention is not limited to the above embodiment and includes various modification examples. For example, the above embodiment has been described in detail for easy understanding of the present invention, and the present invention is not necessarily limited to including all the configurations described.

REFERENCE SIGNS LIST

1 Gas compressor
2 Suction filter
3 Suction throttle valve
4 Compressor main body
5 Electric motor
6 Pressure regulating check valve
7 Pressure sensor
8 Control device
9 Opening and closing device
10 Discharge port
11 Control unit
12 Memory
13 Storage device
14 Input and output I/F
15 Communication I/F
80 Master compressor M
81 to 83 No. 1 to No. 3 slave compressors S1 to S3
90 Collection pipe
91 Receiver tank
92 Machine
93 Communication connection

The invention claimed is:

1. A gas compressor set as a master gas compressor that performs compressor number control on N slave gas compressors, the master gas compressor comprising:
a communication interface that is communicable with the slave gas compressors; and
a control unit that communicates with each of the slave gas compressors via the communication interface,
wherein one cycle of communication with the N slave gas compressors in N communication sets is defined as a total compressor number communication cycle, in an initial total compressor number communication cycle, in first to $N^{th}$ communication sets, the control unit transmits a first response request to each of first to $N^{th}$ slave gas compressors, and when the control unit receives a response from the slave gas compressors, the control unit determines that communication connection with the slave gas compressors has succeeded, and when the control unit receives no response from the slave gas compressors, the control unit determines that communication connection with the slave gas compressors has failed, and
in second and following total compressor number communication cycles, the control unit transmits a second response request to the slave gas compressors, with which the communication connection has succeeded, in each of the communication sets, and transmits the first response request to the slave gas compressors, with which the communication connection has failed.

2. An apparatus comprising:
a communication interface that is communicable with an external gas compressor;
an input and output interface; and
a control unit that communicates with the external gas compressor via the communication interface,
wherein based on information input from the input and output interface, the control unit sets, via the communication interface, a host gas compressor as a master gas compressor that performs compressor number control on the external gas compressor as a slave gas compressor, or sets, via the communication interface, the host gas compressor as a slave gas compressor on which the compressor number control is performed by the external gas compressor as a master gas compressor,
in a case where the host gas compressor is set as the master gas compressor, when one cycle of communication with N slave gas compressors as the external gas compressors in N communication sets is defined as a total compressor number communication cycle, in an initial total compressor number communication cycle, in first to $N^{th}$ communication sets, the control unit transmits a first response request to each of first to $N^{th}$ slave gas compressors, and when the control unit receives a response from the slave gas compressors, the control unit determines that communication connection with the slave gas compressors has succeeded, and when the control unit receives no response from the slave gas compressors, the control unit determines that communication connection with the slave gas compressors has failed, and
in second and following total compressor number communication cycles, the control unit transmits a second response request to the slave gas compressors, with which the communication connection has succeeded, in each of the communication sets, and transmits the first response request to the slave gas compressors, with which the communication connection has failed.

3. The gas compressor according to claim 1, wherein a timing at which the first response request is transmitted to the slave gas compressor, with which the communication connection has failed, is determined by $(N-1)(T-1)+n$; wherein N is a total number of the slave gas compressors, T is a total number of compressor communication cycles, and n is a number of one slave gas compressor of the N slave gas compressors in the communication set.

4. The apparatus according to claim 2, further comprising:
a display unit,
wherein when the control unit sets the host gas compressor as the master gas compressor, the control unit causes the display unit to display a number, which specifies the slave gas compressor with which the communication connection has failed, as a communication abnormality.

5. The apparatus according to claim 2,
wherein when the control unit sets the host gas compressor as the slave gas compressor, the control unit transmits a response for the first response request, which is sent from the master gas compressor via the communication interface, to the master gas compressor via the communication interface.

6. The apparatus according to claim 2,
wherein the control unit sets a compressor number for the host gas compressor and a compressor number for the master gas compressor based on the information input from the input and output interface, and
when the host gas compressor is set as the master gas compressor, in the total compressor number communication cycle, communication for the compressor number control with the slave gas compressors having larger compressor numbers than the compressor number of the master gas compressor is performed in ascending order of the compressor numbers, and as for the slave gas compressors having smaller compressor numbers than the compressor.

7. The gas compressor according to claim 2, wherein a timing at which the first response request is transmitted to the slave gas compressor, with which the communication connection has failed, is determined by $(N-1)(T-1)+n$; wherein N is a total number of the slave gas compressors, T is a total number of compressor communication cycles, and n is a number of one slave gas compressor of the N slave gas compressors in the communication set.

* * * * *